United States Patent
Kröll et al.

[11] Patent Number: 5,927,916
[45] Date of Patent: Jul. 27, 1999

[54] AUTOMATIC LOCKING DEVICE FOR CONTAINERS, INTERCHANGEABLE CONTAINERS OR THE LIKE

[75] Inventors: Joachim Kröll, Jüchen; Hermann Franzen, Mönchengladbach, both of Germany

[73] Assignee: Mannesmann Aktiengesellschaft, Düsseldorf, Germany

[21] Appl. No.: 08/927,841

[22] Filed: Sep. 11, 1997

[30] Foreign Application Priority Data

Sep. 18, 1996 [DE] Germany .......................... 196 39 988

[51] Int. Cl.⁶ ....................................... B60P 7/13
[52] U.S. Cl. ................... 410/83; 410/77; 410/82
[58] Field of Search ................. 410/77, 80, 82, 410/83, 76, 72, 73, 54; 248/500, 503, 681; 280/DIG. 8, 406.1

[56] References Cited

U.S. PATENT DOCUMENTS

| | | | |
|---|---|---|---|
| 3,486,787 | 12/1969 | Campbell | 410/80 |
| 4,013,017 | 3/1977 | Toyota et al. | 410/83 X |
| 4,108,081 | 8/1978 | Blanz | 410/82 |
| 4,125,077 | 11/1978 | Baaso | 410/82 |

FOREIGN PATENT DOCUMENTS

| | | | |
|---|---|---|---|
| 1 906 826 | 2/1969 | Germany . | |
| 23 43 251 | 8/1973 | Germany . | |
| 196 10 374 A1 | 9/1996 | Germany . | |
| 54-156957 | 12/1979 | Japan | 248/500 |
| 1199594 | 7/1970 | United Kingdom . | |
| 1 306 805 | 2/1973 | United Kingdom . | |
| 1455484 | 11/1976 | United Kingdom | 410/83 |
| 2 183 713 | 6/1987 | United Kingdom . | |

*Primary Examiner*—Stephen T. Gordon
*Attorney, Agent, or Firm*—Cohen, Pontani, Lieberman & Pavane

[57] ABSTRACT

A locking device for standardized transport vessels, such as containers, interchangeable containers or the like, on loading surfaces of transporting devices includes clamping pins which are at least partially movable upward out of the loading surface from their rest positions below the loading surface into vertical working positions and which are lockable in this position by their clamping pin heads, which are provided at their free ends, in openings in the corner regions of the transport vessels. For this purpose, every clamping pin is part of a vertically acting piston-cylinder unit which is fastened below the loading surface to the frame of the transporting device. The vertical stroke of every piston-cylinder unit corresponds to the outward path traveled by the clamping pin with the clamping pin head upward out of the loading surface. The clamping pin head is designed as a hammer head, and a motor acts at the circumference of the clamping pin. The motor rotates the clamping pin with the clamping pin head by 90° around its vertical axis.

6 Claims, 6 Drawing Sheets

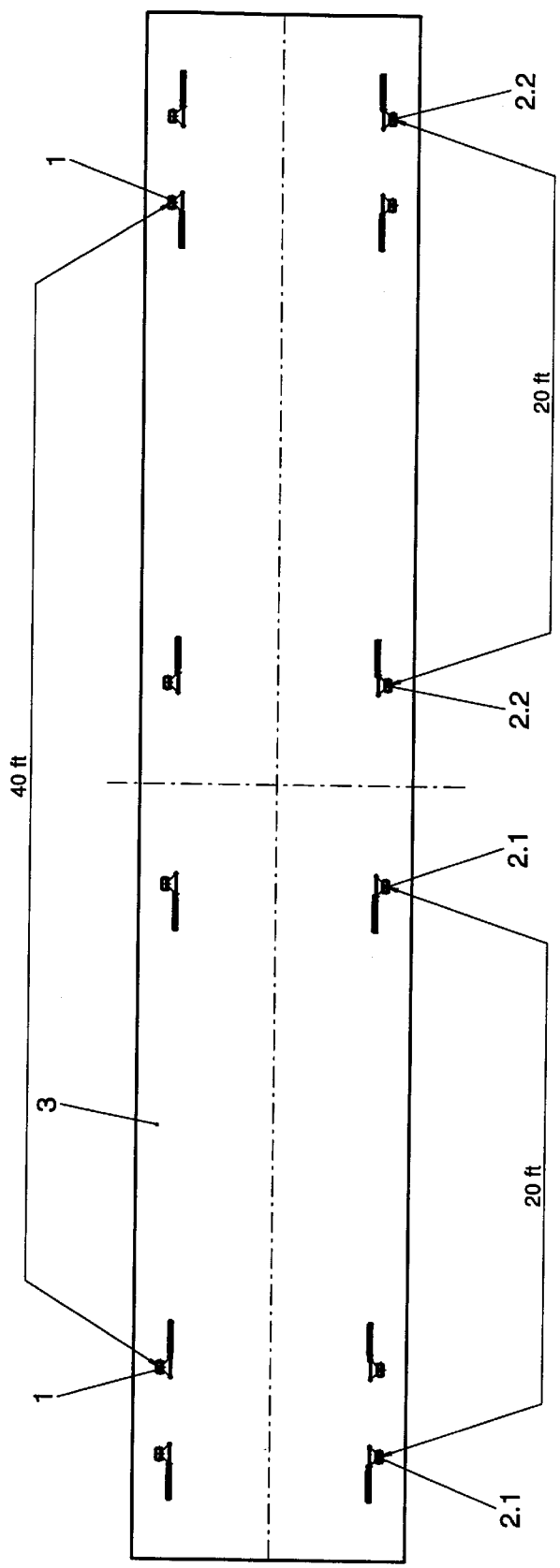

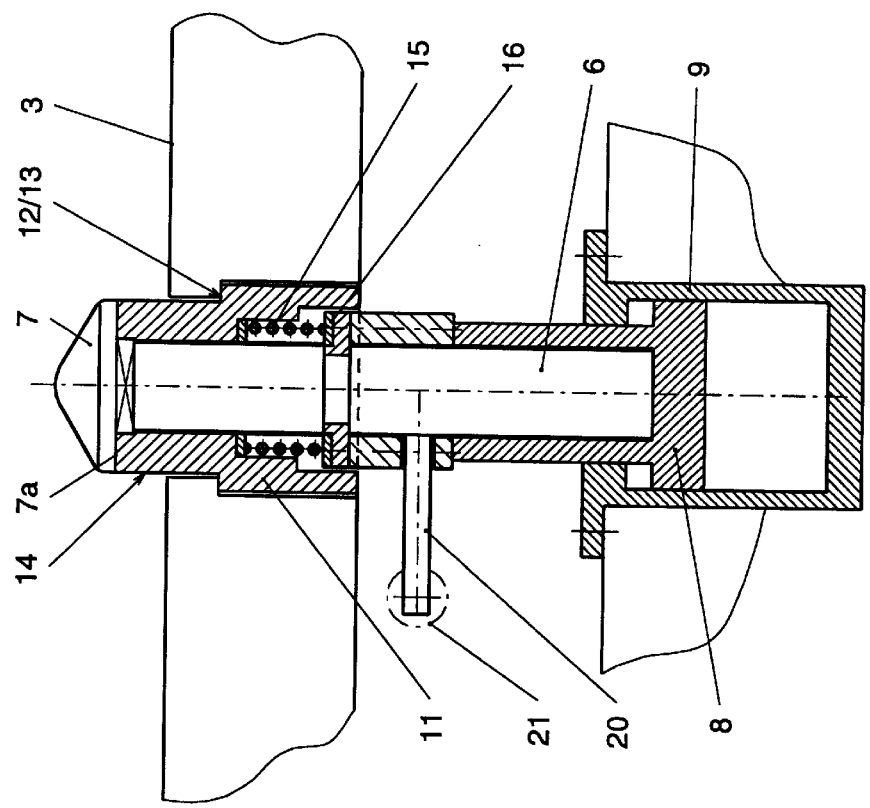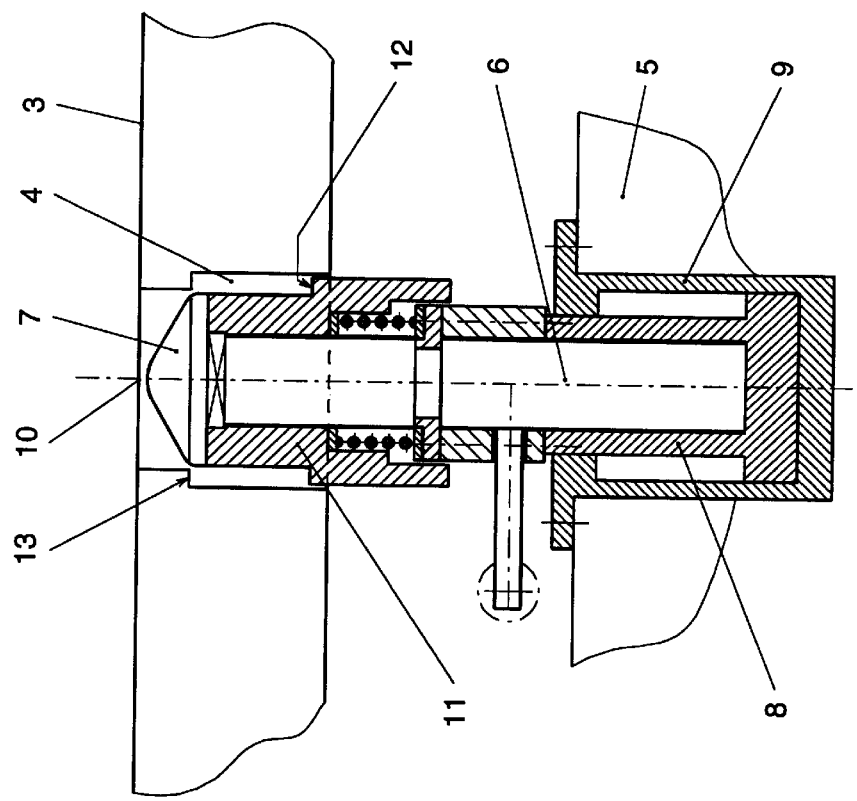

AUTOMATIC LOCKING DEVICE FOR CONTAINERS, INTERCHANGEABLE CONTAINERS OR THE LIKE

BACKGROUND OF THE INVENTION

1. Field of the Invention

The invention is directed to locking means for standardized transport vessels, such as containers, interchangeable containers or the like, on loading surfaces of transporting devices. More specifically, the present invention is directed to securing containers by means of clamping pins which are at least partially movable upward out of the loading surface from their rest positions below the loading surface into vertical working positions and which are lockable in this position by their clamping pin heads, which are provided at their free ends, in openings in the corner regions of the transport vessels.

2. Description of the Related Art

A German reference DE-OS 19 06 826 discloses a generic fold-in rotational locking arrangement for containers positioned on a vehicle. The disclosed standardized construction can be used together with the same frame carrier currently in use on transport vehicles. As a result of the horizontal folding of the rotational lock described therein along with all add-on parts in the housing below the loading surface, the rotational locking arrangement in this state does not project beyond the carrier profile of the existing vehicle frame either in the upward or downward direction. In the disclosed solution, the rotational locking arrangement is actuated manually by swivel levers or handles as is also the case in locking devices of different constructions.

Of increasing importance in modern goods transportation is the reduction of loading and unloading times for container transport vehicles and the extensive restriction of manual operation by automating the loading process. Since the loading time required for transport vehicles represents unproductive time, the goal is to dispense with the manual operation and use of auxiliary personnel entirely.

There have already been sufficient suggestions, some of which have also been realized, for achieving the goal of automatic loading and unloading of container vehicles. However, there are presently no known automatically operated load securing means for locking the load on the loading surface of transport vehicles.

SUMMARY OF THE INVENTION

It is the object of the present invention to provide automatic locking means for standardized transport vessels such as containers, interchangeable containers or the like on loading surfaces of transport vehicles which can be activated and locked by remote control.

This object is met according to the invention in that every clamping pin is part of a vertically acting piston-cylinder unit which is fastened below the loading surface to the frame of the transporting device. The vertical stroke of every piston-cylinder unit corresponds to the path traveled by the its associated clamping pin. The clamping pin head is directed upward out of the loading surface, in that the clamping pin head is designed as a hammer head. In addition a motor is operationally connected to the circumference of the clamping pin such that when the motor rotates, the clamping pin with the clamping pin head can be swiveled by 90° around its vertical axis.

As a result of the suggestions according to the invention, it is possible to lock automatically any container or interchangeable container provided with fastening points in accordance with industry standards. There are substantial advantages over conventional goods transports; the invention can be applied equally advantageously when using driverless transport systems as well as when the transport vessels are transported on trucks and freight cars. While known locking means are actuated individually by personnel accompanying the transport, automatic locking means make it possible for the driver to activate the locking means specifically suited to the particular type of vessel without leaving the driver's cab.

In a special embodiment of the invention, every clamping pin is connected concentrically with a piston of a piston-cylinder unit. The clamping pin is also enclosed below its clamping pin head coaxially by a guide piece which is displaceable on the clamping pin in the longitudinal direction thereof. The guide piece and the clamping pin, together, are movable in a bore hole corresponding to the contour of the guide piece in the loading surface of the transport device into a position defining its travel or stroke. At least a portion of the guide piece, whose end face engages behind the clamping pin head, projects out of the loading surface at its upper position. When the guide piece is in its upper position, the clamping pin can move out farther opposite the guide piece against the force of a spring until reaching an end position in which the clamping pin head is lockable with the transport vessel by rotating the clamping pin about its vertical axis and using the piston of the piston-cylinder unit to bring the clamping pin head down after it has been rotated.

It has already been proposed to provide twist locks, as they are called, at the spreader as stop means for ISO containers. However, the installation position of the twist locks is rotated by 180°. The load is thus suspended in the twist locks.

According to another feature of the invention for advantageous locking of the transport vessels on the loading surface, the projections of the clamping pin head and guide piece coincide on a plane of projection considered vertically to the longitudinal axial direction of the clamping pin. When the transport vessel is put on and inserted into the locking openings, the guide piece and clamping pin head form a compact construction unit in which the clamping pin head contacts the end face of the guide piece.

According to another feature of the invention, in order for the guide piece to project out of the loading surface at the height required for locking the transport vessel, steps are provided which reduce the cross section of the bore holes to limit the travel of the guide piece in the bore holes of the loading surface. A step on the guide pieces can be brought into contact behind these steps, wherein the steps are so arranged that the length of the guide piece required for locking the transport vessel projects above the loading surface.

To ensure that the guide piece sitting on the clamping pin is carried along when the piston moves out of the piston-cylinder unit with the clamping pin, a pressure spring is arranged between the guide piece and a collar disk on the clamping pin which encloses the clamping pin concentrically. The force of the pressure spring corresponding at least to the gravitational force of the guide piece.

According to another feature of the invention, for the purpose of rotating the clamping pin, a lever arm extends out laterally from the clamping pin below the loading surface. A swivel cylinder is connected with the frame of the loading surface to act on the lever arm.

The invention provides an intelligent link between transporting technology and railway technology. The invention also makes it possible to retrofit conventional transport systems with the advantageous devices so that these transport systems can also be rendered faster and thus more economical by reducing nonproductive time.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals delineate similar elements throughout the several views:

FIG. 1 shows a top view of a loading surface of a transporting device;

FIG. 2 shows a side view of an embodiment of a locking means of the present invention in a deactivated position;

FIG. 3 shows a side view of the locking means of FIG. 2 with a clamping pin head and a guide piece projecting above the loading surface.

DETAILED DESCRIPTION OF THE PRESENTLY PREFERRED EMBODIMENTS

Figure 4:
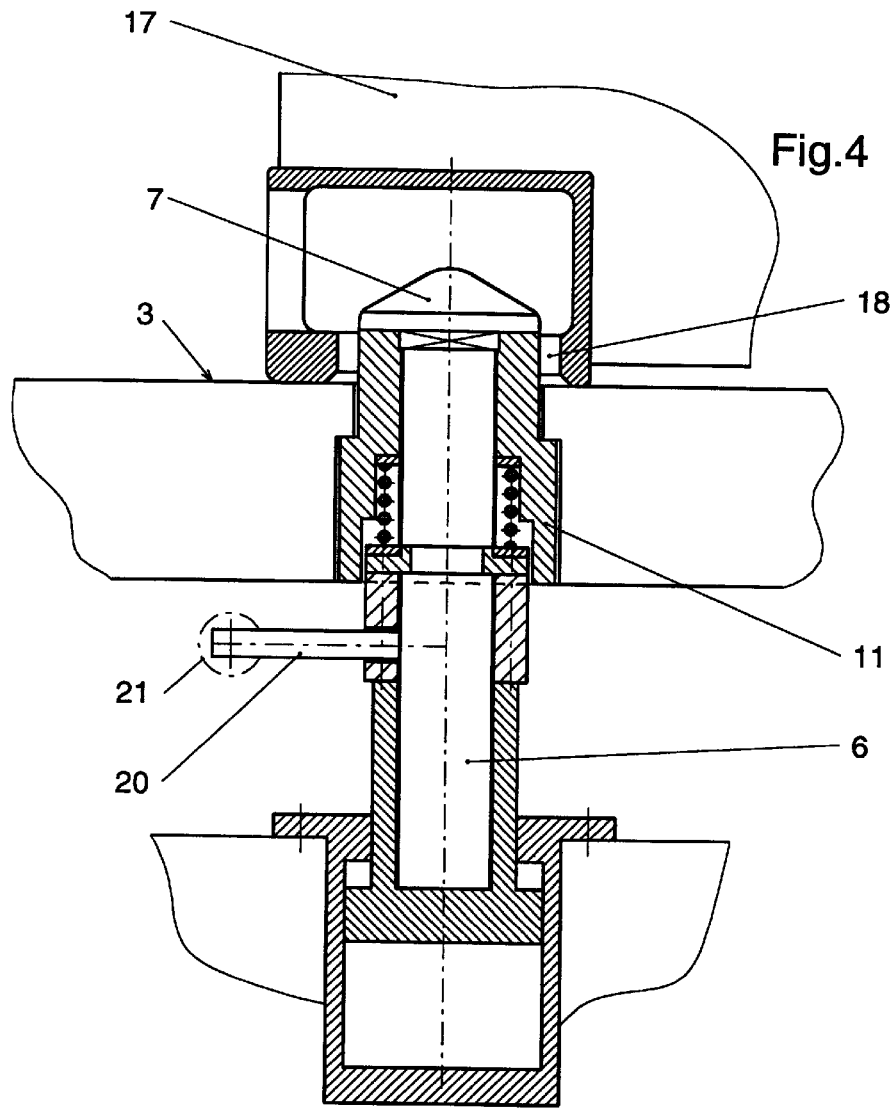
FIG. 4 shows a side view of the locking means of FIG. 3 with a transport vessel over it.

Referring to FIG. 1, a loading surface plane 3 of a transporting device for 20 ft and 40 ft ISO containers and for interchangeable containers requires twelve locking points 1, 2.1, 2.2 for locking a load. Depending upon the type and size of the load, different locking points 1, 2.1, 2.2 of a locking device (not shown in FIG. 1) are activated. In the top half of FIG. 1, two of the four locking points required for securing the load of a 40 ft ISO container are designated by 1. In the lower half of the drawing, four locking points for two 20 ft ISO containers are designated by 2.1 and 2.2. In both cases, the oppositely located locking points 1, 2.1, 2.2 are required in a mirror-inverted manner with respect to the longitudinal axis of loading surface 3.

Figure 5:
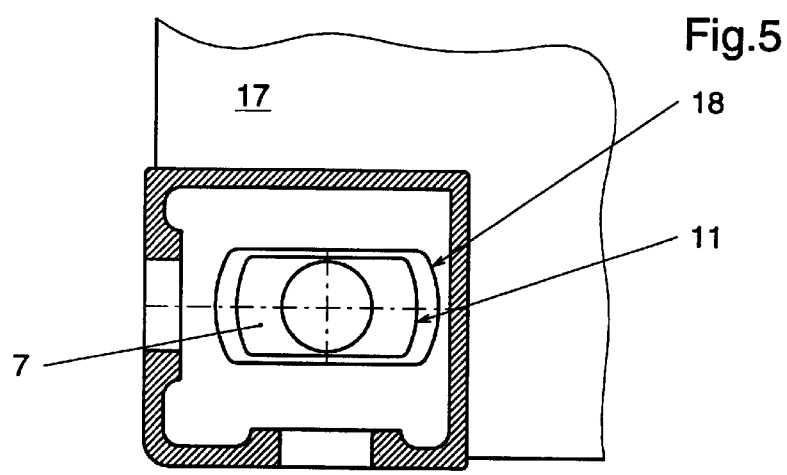
FIG. 5 shows a top view of the locking means of FIG. 4 with transport vessel positioned over it.

Referring now to FIG. 2, a locking device according to the invention includes a clamping pin 6 with a clamping pin head 7 at its free end. Clamping pin 6 and clamping pin head 7 are guided within a bore hole 4 penetrating loading surface 3 of the frame 5. Clamping pin head 7 is constructed in the manner of a hammer head. That is, clamping pin head 7 is substantially rectangular in its projection. At its other end, clamping pin 6 is fastened to a piston 8 of a piston-cylinder unit 9 which is acted upon at two sides by a pressure medium. Piston-cylinder unit 9 serves as an actuator to move clamping pin 6 into and out of bore hole 4. Below clamping pin head 7, a guide piece 11 is concentrically slidably mounted so as to be displaceable along a longitudinal axis 10 of clamping pin 6. The outer contour of clamping pin head 7 corresponds to the outer contour of guide piece 11. The outer surface of guide piece 11 has a step 12. A corresponding step 13 is provided in bore hole 4 and forms a stop for guide piece 11. Referring now also to FIG. 3, step 13 prevents guide piece 11 from extending through bore hole 4 in the extended position of piston 8. In this position, a part 14 of the guide piece 11 projects above loading surface 3. Clamping pin head 7 rests on the guide piece 11 at the front or end side 7a. A pressure spring 15 is concentrically installed over clamping pin 6 between guide piece 11 and a collar disk 16 on clamping pin 6. Pressure spring 15 causes guide piece 11 to be pressed against step 12 or 13 at loading surface 3 or at guide piece 11. Collar disk 16 is constructed in two parts for assembly. It can also be seen in FIG. 3 that piston 8 of piston-cylinder unit 9 is not completely extended. Referring now also to FIG. 4, a transport vessel 17 (i.e. an ISO container) is placed on loading surface 3. Clamping pin head 7 engages a bore hole 18 of transport vessel 17 (FIG. 5 shows the shape and extension of bore hole 18). Transport vessel 17 is guided over clamping pin head 7 and its shape, such that transport vessel 17 is deposited on the loading surface 3 in a centered manner.

Referring now to FIG. 5, the contour of guide piece 11 and clamping pin head 7 coincide, such that both parts are positioned with a predetermined tolerance (dependent upon by the opening size of the corner fitting of the transport vessel 17).

Figure 6:
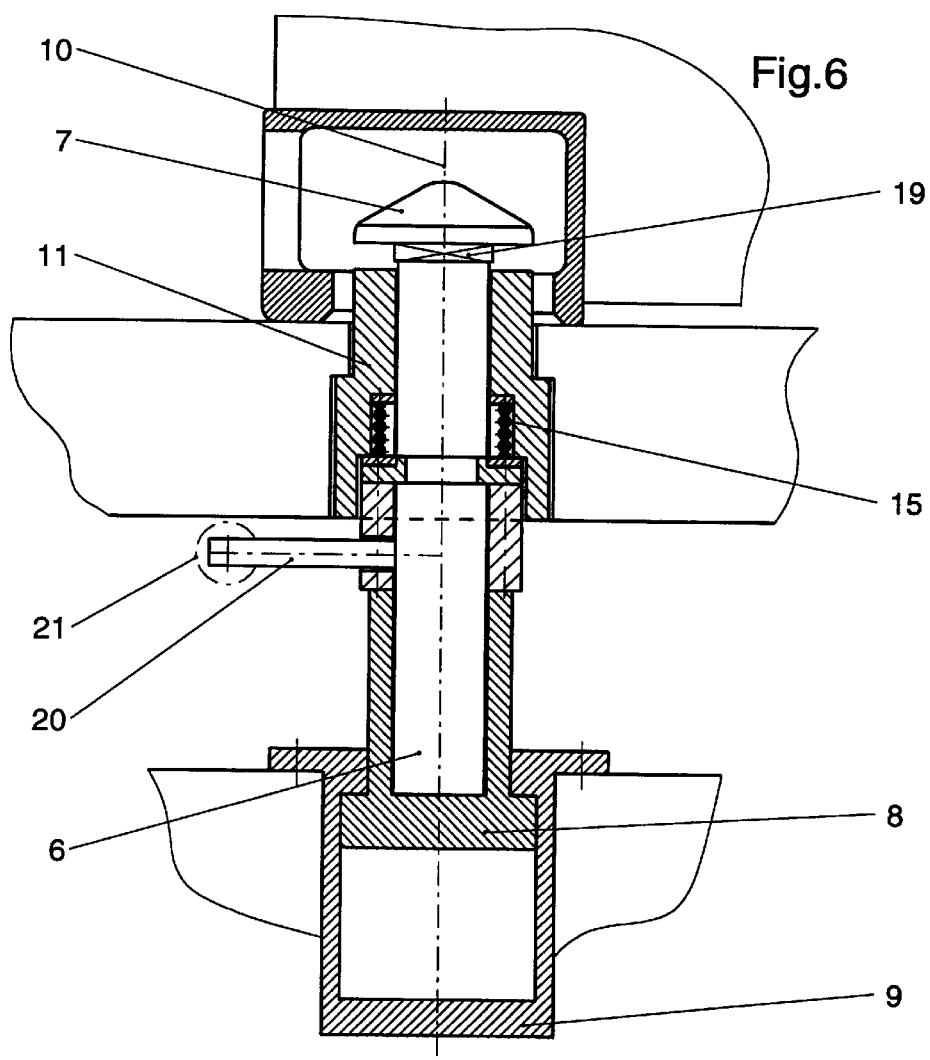
FIG. 6 shows a side view of the locking means of FIG. 3 with the clamping pin head projecting out of the guide piece.
Figure 7:
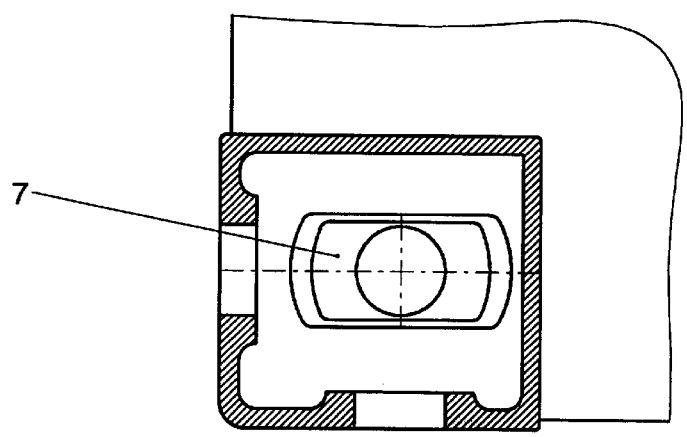
FIG. 7 shows a top view of the locking means of FIG. 6 with the transport vessel positioned over it.

Referring now to FIG. 6, piston 8 of piston-cylinder unit 9 is further acted upon by the pressure medium such that piston 8 reaches an end position, whereat it contacts the upper portion of the cylinder of piston-cylinder unit 9. In doing so, clamping pin 6 connected with piston 8 is further displaced along the direction of its longitudinal axis 10, through guide piece 11. A square piece 19 which is formed at the rear of clamping pin head 7 rises out of guide piece 11. At the same time, pressure spring 15 is compressed and holds step 12 of guide piece 11 in position against step 13. Referring now also to FIG. 7 is a top view of the arrangement is shown.

Figure 8:
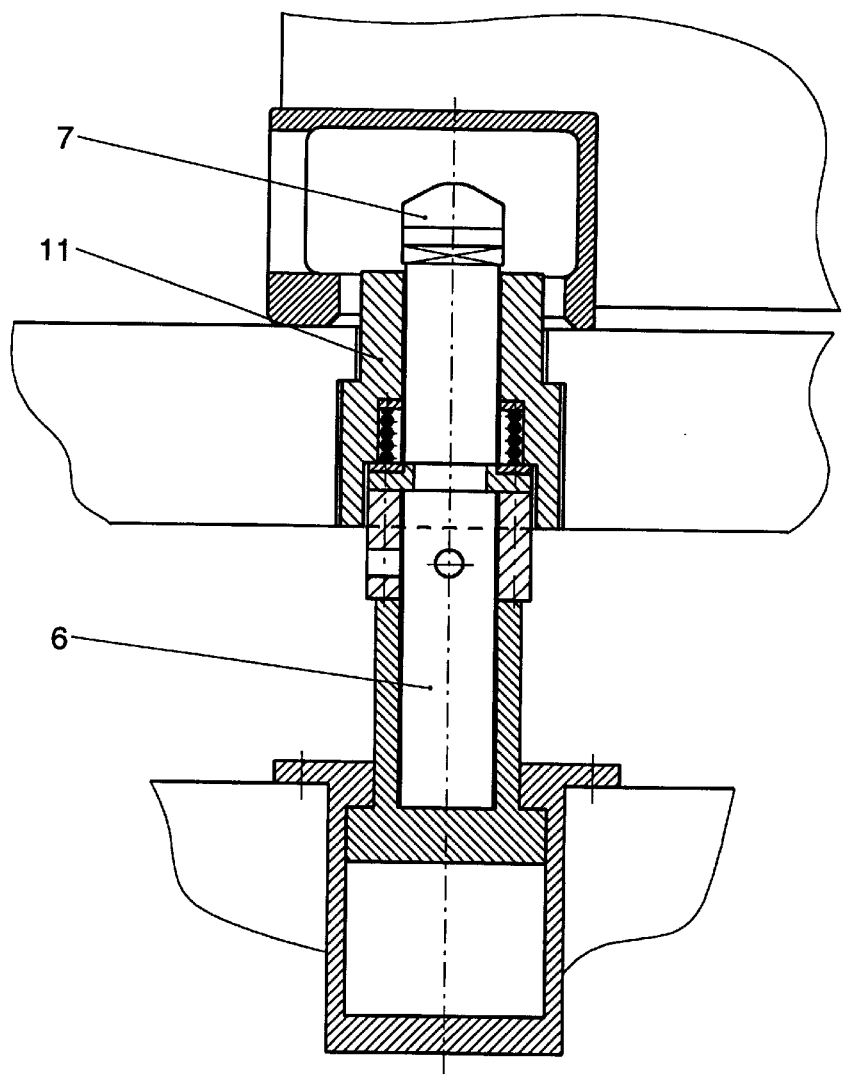
FIG. 8 shows a side view of the locking means in the active state during the locking process.
Figure 9:
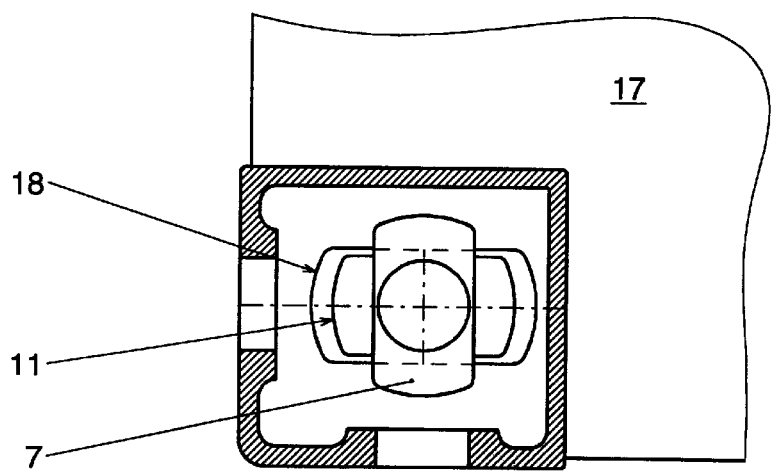
FIG. 9 shows a top view of the locking means of FIG. 8.
Figure 10:
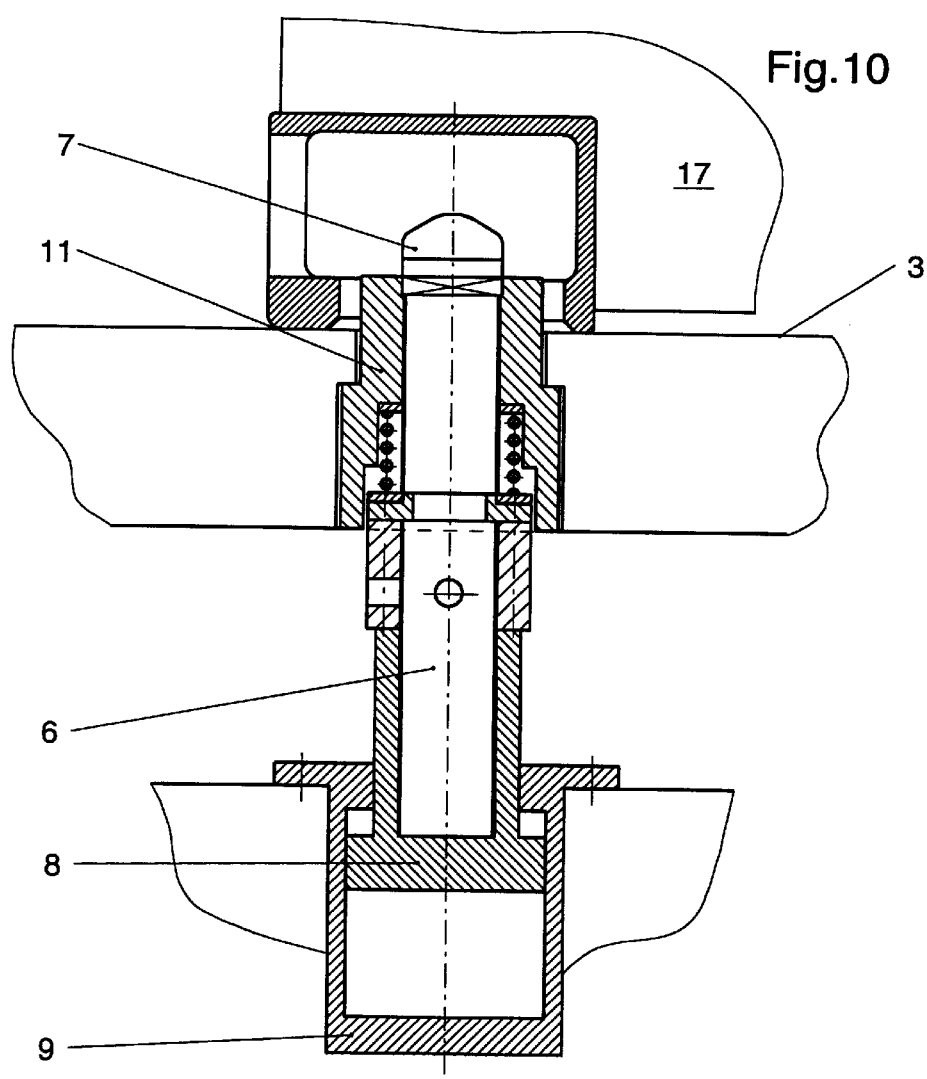
FIG. 10 shows a side view of the locking means in the position following the locking process.
Figure 11:
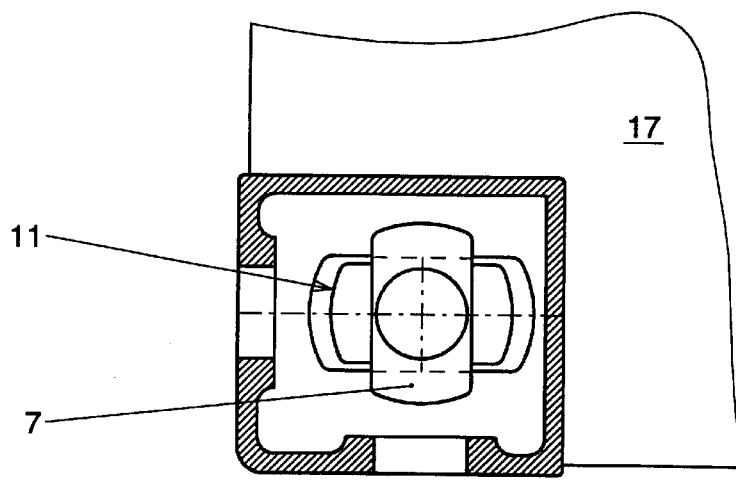
FIG. 11 shows a top view of the locking means of FIG. 10.

A lever arm 20, extends laterally from clamping pin 6. A motor 21, which is indicated schematically, acts upon lever arm 20. The position of locking device shown in FIG. 8 is reached by swiveling this lever arm by 90°. Clamping pin head 7, constructed as a hammer head, is rotated with clamping pin 6 by 90° within guide piece 11 such that clamping pin head 7 now extends transversely to bore hole 18 in the corner fitting of transport vessel 17. This is also shown in FIG. 9. In this position, pressure within piston-cylinder unit 9 is removed such that pressure spring 15 pulls clamping pin head 7 against the corner fitting of transport vessel 17. In this manner, transport vessel 17 is clamped onto loading surface 3. In this position, which is shown again in a top view in FIG. 11, transport vessel 17 is securely fixed against loading surface 3 to prevent sliding and can only be unlocked again by a reverse sequence of the above described movements.

Since clamping pin 6 can be lowered below loading surface 3, the present locking device allows transport vessel 17 to be set down over clamping pins 6 that are not in use. Clamping pins 6 are only moved up out of the lowered position through loading surface 3 when required to secure transport vessel 17. Together with guide piece 11, clamping pins 6, according to the invention, enable a reliable positioning and centering of transport vessel 17 and, after rotating clamping pin head 7 and clamping it onto a corner fitting of transport vessel 17, enable a reliable holding of transport vessel 17 on loading surface 3.

The invention is not limited by the embodiments described above which are presented as examples only but can be modified in various ways within the scope of protection defined by the appended patent claims.

We claim:

1. A locking means for a container on a loading surface having a frame, said locking means comprising a locking device which further comprises:

a clamping pin, having a top end, a bottom end, and a longitudinal axis, being longitudinally movably mounted in the frame along said longitudinal axis;

a clamping pin head fixed to said top end of said clamping pin, said clamping pin head being hammer head shaped;

said clamping pin being movable between a lower position, whereat said clamping pin head is below the loading surface, and an upper position, whereat said clamping pin head and a portion of said clamping pin protrudes above the loading surface, through a hole in the loading surface;

an actuator fixedly mounted in the frame and operatively connected to said clamping pin for moving said clamping pin between said lower position and said upper position;

said clamping pin being rotatable about said longitudinal axis; and a motor operatively connected to said clamping pin for rotating said clamping pin through 90 degrees of rotation;

a guide piece slidably coaxially mounted on said clamping pin below said clamping pin head;

a collar fixedly connected about said clamping pin below said guide piece;

a spring coaxially mounted about said clamping pin between said collar and said guide piece, said spring urging said guide piece toward said clamping pin head; and said guide piece engaging the hole in the loading surface when said clamping pin is at a central position between said lower position and said upper position, such that said spring is increasingly compressed as said clamping pin is moved from said central position toward said upper position by said actuator.

2. The locking means of claim 1, wherein a portion of said guide piece projects above the loading surface when said guide piece engages said hole of the loading surface.

3. The locking means of claim 1, wherein said locking device further comprises:

a first step on an outer portion of said guide piece; and a second step in the hole of the loading surface corresponding to said first step such that said guide piece is prevented from moving from said central position toward said upper position by an engagement of said first step and said second step.

4. The locking means of claim 1, wherein said actuator comprises a piston-cylinder unit.

5. The locking means of claim 1, wherein said clamping pin head penetrates a container hole in a bottom piece of the container which is aligned over said clamping pin head, and the hole in the bottom piece has an oblong shape such that rotating said hammer head shaped clamping pin head 90 degrees prevents said clamping pin head from being removed from the container hole, thereby locking said container on the loading platform.

6. The locking means of claim 5, wherein said actuator being operatively connected to said clamping pin for pulling said clamping pin downward toward said lower position when said clamping pin head penetrates said hole in said bottom piece and when said clamping pin head is rotated 90 degrees such that said spring urges said hammer head shaped clamping pin head against the bottom piece which is consequently held against the loading surface.

* * * * *